United States Patent
Kim (10) Patent No.: US 12,112,894 B2
(45) Date of Patent: Oct. 8, 2024

(54) MULTILAYER CAPACITOR

(71) Applicant: SAMSUNG ELECTRO-MECHANICS CO., LTD., Suwon-si (KR)

(72) Inventor: Min Jun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 224 days.

(21) Appl. No.: 17/748,795

(22) Filed: May 19, 2022

(65) Prior Publication Data

US 2023/0207208 A1    Jun. 29, 2023

(30) Foreign Application Priority Data

Dec. 23, 2021   (KR) .......................... 10-2021-0186348

(51) Int. Cl.
*H01G 4/30*       (2006.01)
*H01G 4/008*      (2006.01)
(Continued)

(52) U.S. Cl.
CPC .............. *H01G 4/30* (2013.01); *H01G 4/008* (2013.01); *H01G 4/012* (2013.01); *H01G 4/1218* (2013.01)

(58) Field of Classification Search
CPC ................................. H01G 4/30; H01G 4/012
See application file for complete search history.

(56) References Cited

U.S. PATENT DOCUMENTS 6,278,065 B1 * 8/2001 Hopper .................. H01G 4/224
                                                    257/703
9,384,898 B2 * 7/2016 Kang ....................... H01G 4/12
(Continued)

FOREIGN PATENT DOCUMENTS

JP          4374041 B2    12/2009
KR       10-2127804 B1     6/2020

*Primary Examiner* — Sherman Ng
(74) *Attorney, Agent, or Firm* — Morgan, Lewis & Bockius LLP (57) ABSTRACT

A multilayer capacitor includes a body including a capacitance formation region in which at least one first internal electrode and at least one second internal electrode are alternately stacked in a first direction with at least one dielectric layer interposed therebetween, and first and second external electrodes disposed on the body and spaced apart from each other to be connected to the at least one first internal electrode and the at least one second internal electrode, wherein a portion of the at least one first internal electrode and a portion of the at least one second internal electrode overlap each other in the first direction, the capacitance formation region further includes a third internal electrode connected to the first external electrode, a fourth internal electrode connected to the second external electrode, and a fifth internal electrode not connected to the first and second external electrodes and overlapping each of the third and fourth internal electrodes in the first direction, an internal electrode closest to the first external electrode in the first direction in the capacitance formation region is the third internal electrode, and an internal electrode closest to the second external electrode in the first direction in the capacitance formation region is the fourth internal electrode.

19 Claims, 5 Drawing Sheets

(51) Int. Cl.
*H01G 4/012* (2006.01)
*H01G 4/12* (2006.01)

(56) References Cited

U.S. PATENT DOCUMENTS

| | | | |
|---|---|---|---|
| 9,633,784 B2* | 4/2017 | Sawada | H01G 2/065 |
| 2007/0121275 A1* | 5/2007 | Takashima | H01G 4/385 |
| | | | 361/311 |
| 2008/0084651 A1* | 4/2008 | Oguni | H01G 4/012 |
| | | | 361/303 |
| 2009/0015986 A1 | 1/2009 | Togashi | |
| 2012/0162853 A1* | 6/2012 | Togashi | H01G 4/005 |
| | | | 361/301.4 |
| 2012/0188684 A1* | 7/2012 | Akazawa | H01G 4/012 |
| | | | 361/321.2 |
| 2014/0293500 A1* | 10/2014 | Seo | H01G 4/12 |
| | | | 29/25.42 |
| 2015/0170842 A1* | 6/2015 | An | H01G 4/012 |
| | | | 361/321.2 |
| 2016/0133384 A1* | 5/2016 | Park | H01G 4/232 |
| | | | 361/301.4 |
| 2020/0105478 A1* | 4/2020 | Jo | H01G 4/30 |
| 2020/0143990 A1 | 5/2020 | Kim et al. | |
| 2021/0319953 A1* | 10/2021 | Oh | H01G 4/30 |
| 2021/0335547 A1* | 10/2021 | Yokomizo | H01G 4/232 |

* cited by examiner

MULTILAYER CAPACITOR

CROSS-REFERENCE TO RELATED APPLICATION

This application claims the benefit of priority to Korean Patent Application No. 10-2021-0186348 filed on Dec. 23, 2021 in the Korean Intellectual Property Office, the disclosure of which is incorporated herein by reference in its entirety.

TECHNICAL FIELD

The present disclosure relates to a multilayer capacitor.

BACKGROUND

Multilayer capacitors have been widely used as components for electronic devices such as computers, personal digital assistants (PDAs), and mobile phones due to advantages thereof, such as a small size, guaranteed high capacitance, and ease of mounting, and have also been used as parts for electrical devices (including vehicles) due to high reliability and high strength characteristics thereof.

When the multilayer capacitor is used in an electronic device, the multilayer capacitor may be miniaturized, and high capacitance relative to a volume of the multilayer capacitor may become more important. The difficulty of securing reliability of the multilayer capacitor having an advantageous structure to form high capacitance relative to a volume thereof may increase.

When the multilayer capacitor is used in an electric device, a possibility that the multilayer capacitor is exposed to a harsh environment (e.g., high voltage, high temperature) may increase, and it may be difficult to secure reliability in such a harsh environment.

SUMMARY

An aspect of the present disclosure may provide a multilayer capacitor.

According to an aspect of the present disclosure, a multilayer capacitor may include: a body including a capacitance formation region in which at least one first internal electrode and at least one second internal electrode are alternately stacked in a first direction with at least one dielectric layer interposed therebetween; and first and second external electrodes disposed on the body and spaced apart from each other to be connected to the at least one first internal electrode and the at least one second internal electrode, respectively. A portion of the at least one first internal electrode and a portion of the at least one second internal electrode overlap each other in the first direction, the capacitance formation region further includes a third internal electrode connected to the first external electrode, a fourth internal electrode connected to the second external electrode, and a fifth internal electrode not connected to the first and second external electrodes and overlapping a portion of each of the third and fourth internal electrodes in the first direction, an internal electrode closest to the first external electrode in the first direction in the capacitance formation region is the third internal electrode, and an internal electrode closest to the second external electrode in the first direction in the capacitance formation region is the fourth internal electrode.

According to another aspect of the present disclosure, a multilayer capacitor may include: a body including a capacitance formation region in which at least one first internal electrode and at least one second internal electrode are alternately stacked in a first direction with at least one dielectric layer interposed therebetween; and first and second external electrodes disposed on the body and spaced apart from each other to be connected to the at least one first internal electrode and the at least one second internal electrode, respectively. A portion of the at least one first internal electrode and a portion of the at least one second internal electrode overlap each other in the first direction, the capacitance formation region further includes a third internal electrode connected to the first external electrode, a fourth internal electrode connected to the second external electrode, and a fifth internal electrode not connected to the first and second external electrodes and overlapping each of the third and fourth internal electrodes in the first direction, and a region in which the at least one first internal electrode and the at least one second internal electrode form capacitance with each other is disposed between a plurality of regions in which the third, fourth, and fifth internal electrodes form capacitance with each other, and has a larger thickness than a total thickness of the plurality of regions in which the third, fourth, and fifth internal electrodes form capacitance with each other.

According to still another aspect of the present disclosure, a multilayer capacitor may include: a body including a plurality of dielectric layers a plurality of internal electrodes alternately stacked in a first direction with a respective one of the plurality of dielectric layers interposed therebetween to forma capacitance formation region; and first and second external electrodes disposed on the body and spaced apart from each other. The capacitance formation region is divided into three regions which are an upper region, a lower region, and a center region disposed between the upper and lower regions, at least one first internal electrode and at least one second internal electrode are disposed in the center region and connected to the first and second external electrodes, respectively, and have portions overlapping each other in the first direction, a third internal electrode and a fourth internal electrode are disposed in each of the upper and lower regions and spaced apart from each other to be connected to the first and second external electrodes, respectively, and a fifth internal electrode is disposed in each of the upper and lower regions and spaced apart from each of the first and second external electrodes, and has portions overlapping the third and fourth internal electrodes.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments in the present disclosure will now be described in detail with reference to the accompanying drawings.

When directions of a hexahedron are defined in order to clearly describe the exemplary embodiments in the present disclosure, L, W, and T indicated in the drawings represent a length direction, a width direction, and a thickness direction, respectively. Here, the thickness direction may be used as having the same concept as a stacking direction in which dielectric layers are stacked.

Hereinafter, a multilayer capacitor according to an exemplary embodiment in the present disclosure will be described, and, in particular, a multilayer ceramic capacitor (MLCC) will be described, but the present disclosure is not limited thereto.

Figure 1:
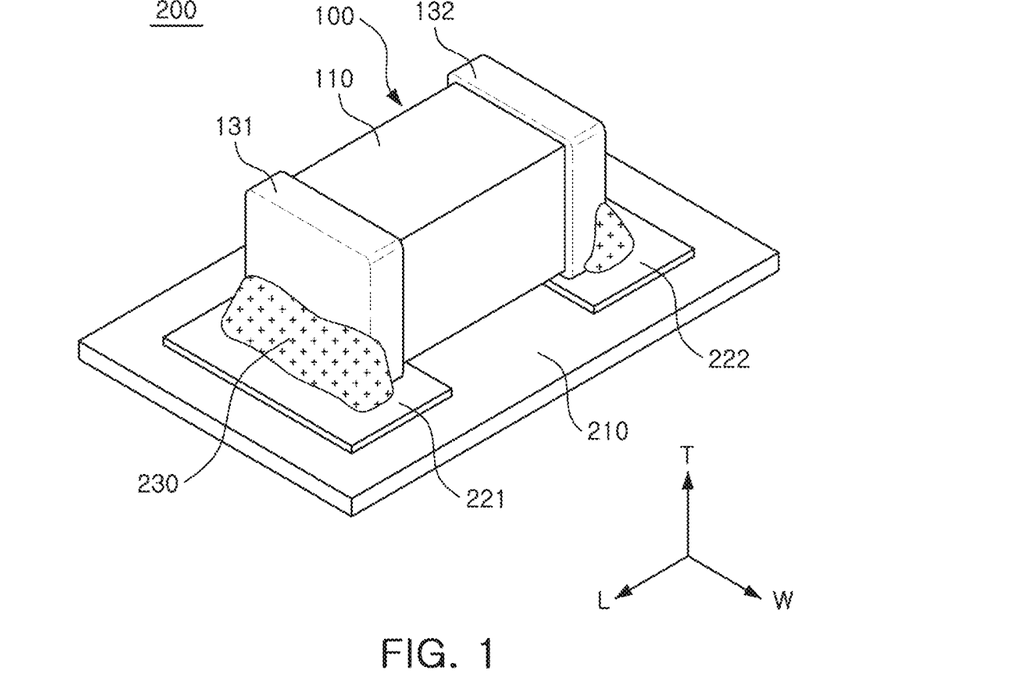
FIG. 1 is a perspective view illustrating a structure in which a multilayer capacitor according to an exemplary embodiment in the present disclosure is mounted on a substrate.
Figure 2:
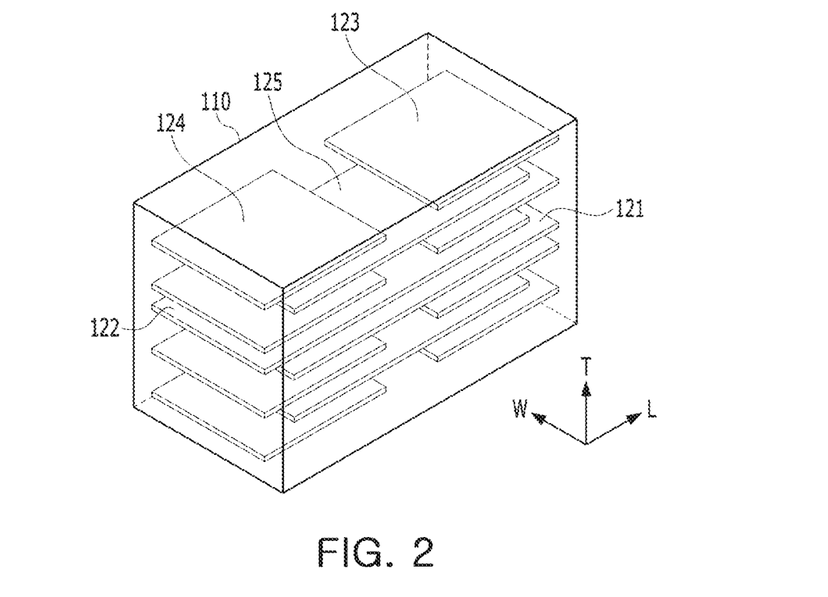
FIG. 2 is a perspective view illustrating an inside of a body of a multilayer capacitor according to an exemplary embodiment in the present disclosure.
Figure 3:
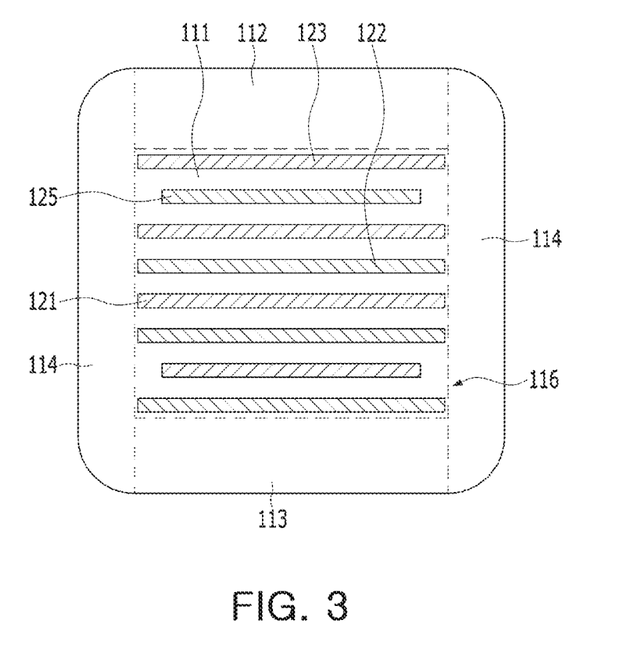
FIG. 3 is a cross-sectional view illustrating a multilayer capacitor according to an exemplary embodiment in the present disclosure in an L direction.
Figure 4:
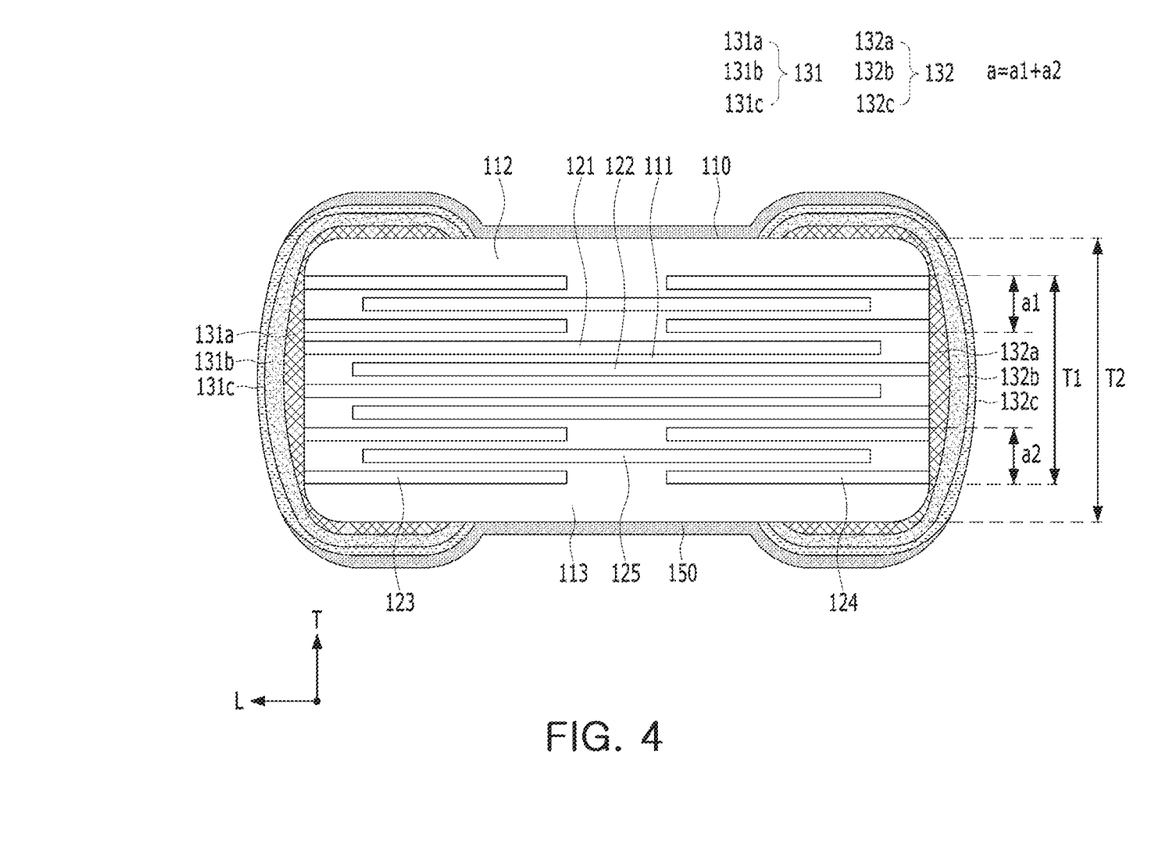
FIG. 4 is a cross-sectional view illustrating a multilayer capacitor according to an exemplary embodiment in the present disclosure in a W direction.

FIG. 1 is a perspective view illustrating a structure in which a multilayer capacitor according to an exemplary embodiment in the present disclosure is mounted on a substrate, FIG. 2 is a perspective view illustrating an inside of a body of a multilayer capacitor according to an exemplary embodiment in the present disclosure, FIG. 3 is a cross-sectional view illustrating a multilayer capacitor according to an exemplary embodiment in the present disclosure in an L direction, and FIG. 4 is a cross-sectional view illustrating a multilayer capacitor according to an exemplary embodiment in the present disclosure in a W direction Referring to FIGS. 1, 2, 3 and 4, a multilayer capacitor 100 according to an exemplary embodiment in the present disclosure may include a body 110, a first external electrode 131, and a second external electrode 132.

The body 110 may include a stack structure in which at least one first internal electrode 121 and at least one second internal electrode 122 are alternately stacked with at least one dielectric layer 111 interposed therebetween in the first direction (e.g., the T direction).

For example, the body 110 may be formed of a ceramic body by firing the stack structure. Here, at least one dielectric layer 111 disposed on the body 110 is in a sintered state, and adjacent dielectric layers may be integrated such that boundaries therebetween may not be readily apparent without using a scanning electron microscope (SEM).

For example, the body 110 may be formed as a hexahedron having both side surfaces in the length direction (L), both side surfaces in the width direction (W), and both side surfaces in the thickness direction (T), and the corners may be polished to have a rounded shape. However, the shape and size of the body 110 and the number of stacked dielectric layers 111 are not limited to those shown in the present exemplary embodiment.

A thickness of at least one dielectric layer 111 may be arbitrarily changed according to a capacitance design of the multilayer capacitor 100, and the dielectric layer 111 may include ceramic powder having high permittivity, for example, a barium titanate ($BaTiO_3$)-based powder, but the present inventive concept is not limited thereto. In addition, various ceramic additives (e.g., MgO, $Al_2O_3$, $SiO_2$, ZnO), organic solvents, plasticizers, binders, dispersants, etc. may be added to the ceramic powder according to a required standard of the multilayer capacitor 100.

An average particle diameter of the ceramic powder used to form the at least one dielectric layer 111 is not particularly limited and may be adjusted according to the required standard (e.g., miniaturization and/or high capacitance is required, such as in a capacitor for an electronic device, or a high withstand voltage characteristic and/or strong strength is required, such as in a capacitor for an electric device), but may be adjusted to, for example, 400 nm or less.

For example, the at least one dielectric layer 111 may be formed by applying and drying a slurry formed to include powder such as barium titanate ($BaTiO_3$) on a carrier film to provide a plurality of ceramic sheets. The ceramic sheet to prepare a plurality of ceramic sheets. The ceramic sheet may be formed by preparing a slurry by mixing ceramic powder, a binder, and a solvent and forming the slurry in a sheet type having a thickness having a few μm by a doctor blade method, but is not limited thereto.

The at least one first internal electrode 121 and the at least one second internal electrode 122 may be formed by printing a conductive paste including a conductive metal and alternately exposing the first internal electrode 121 and the second internal electrode 122 to one side surface and the other side surface of the body 110 in the length direction L along the stacking direction (e.g., the T direction) of the dielectric layer, and may be electrically insulated from each other by the dielectric layer interposed therebetween.

For example, each of the at least one first internal electrode 121 and the at least one second internal electrode 122 may be formed by forming a conductive paste for an internal electrode including a conductive metal powder having an average size of 0.1 to 0.2 μm and a conductive metal powder of 40 to 50 wt %, but are not limited thereto. The conductive paste may be a single material such as nickel (Ni), copper (Cu), palladium (Pd), silver (Ag), lead (Pb), or platinum (Pt), or alloys thereof, but the present invention is not limited thereto.

For example, an internal electrode pattern may be formed by applying the conductive paste for an internal electrode on the ceramic sheet by a printing method or the like. As the method of printing the conductive paste, a screen printing method, a gravure printing method, an inkjet printing method, etc. may be used but the present disclosure is not limited thereto. For example, the body 110 may be manufactured by stacking 200 to 300 layers of the ceramic sheet printed with the internal electrode pattern, pressing, and firing the ceramic sheets.

Capacitance of the multilayer capacitor 100 may be proportional to an overlapping area between the at least one first internal electrode 121 and the at least one second internal electrode 122 in the stacking direction (e.g., the T direction) and may be proportional to the total number of stacking of the at least one first internal electrode 121 and the at least one second internal electrode 122 and may be inversely proportional to an interval between the at least one first internal electrode 121 and the at least one second internal electrode 122. The interval may be substantially equal to the thickness of each of the at least one dielectric layer 111.

The multilayer capacitor 100 may have a larger capacitance compared to a thickness thereof as the interval between the at least one first internal electrode 121 and the at least one second internal electrode 122 decreases. Meanwhile, a withstand voltage of the multilayer capacitor 100 may be higher as the interval increases. Therefore, the interval may be adjusted according to the required standard (e.g., miniaturization and/or high capacitance are required, such as a capacitor for electronic devices, or high withstand voltage characteristics and/or strong strength are required, such as a capacitor for electric devices) of the multilayer capacitor 100. The thickness of each of the at least one first internal electrode 121 and the at least one second internal electrode 122 may also be affected by the interval.

For example, in the multilayer capacitor 100, when high withstand voltage characteristics and/or strong strength are required, the interval between the at least one first internal electrode 121 and the at least one second internal electrode 122 may be designed to exceed twice the thickness of each of the first internal electrode 121 and the second internal electrode 122. For example, when miniaturization and/or high capacitance are required, the multilayer capacitor 100 may be designed such that a thickness of each of at least one first internal electrode 121 and at least one second internal electrode 122 is 0.4 μm or less and a total stacking number of layers is 400 or more.

The first and second external electrodes 131 and 132 may be disposed on the body 110 to be spaced apart from each other so as to be respectively connected to the at least one first internal electrode 121 and the at least one second internal electrode 122.

For example, each of the first and second external electrodes 131 and 132 may be formed by a method of dipping each of the first and second external electrodes 131 and 132 into a paste including a metal component, a method of printing a conductive paste, a sheet transfer, and a pad transfer method, sputter plating, electrolytic plating, or the like. For example, the first and second external electrodes 131 and 132 may include a sintered layer formed as the paste is sintered and a plating layer formed on an outer surface of the sintered layer, and may further include a conductive resin layer disposed between the sintered layer and the plating layer. For example, the conductive resin layer may be formed as conductive particles are contained in a thermosetting resin such as epoxy. The metal component may be single material such as copper (Cu), palladium (Pd), platinum (Pt), gold (Au), silver (Ag), lead (Pb), tin (Sn), etc or alloys thereof, but is not limited thereto.

The multilayer capacitor 100 may be mounted or embedded in the substrate 210 and connected to the first and second pads 221 and 222 on the substrate 210 through the first and second external electrodes 131 and 132 to be electrically connected to a circuit (e.g., an integrated circuit, a processor) electrically connected to the substrate 210.

In a state in which the first and second external electrodes 131 and 132 of the multilayer capacitor 100 are mounted on the first and second pads 221 and 222 of the substrate 210, the solder 230 may be disposed to contact the first and second external electrodes 131 and 132 and first and second pads 221 and 222 through a reflow process to fix the first and second external electrodes 131 and 132 and first and second pads 221 and 222. The solder 230 may have a lower melting point than copper (Cu), which may be contained in the first and second external electrodes 131 and 132, and may include tin (Sn) or a tin-based alloy.

Referring to FIGS. 2, 3 and 4, the body 110 may include at least one of an upper cover layer 112, a lower cover layer 113, a side margin part 114, and a capacitance formation region 116. According to a design, a portion of the surface of the body 110 may be covered by a coating layer 150.

The coating layer 150 may cover the outer surfaces of the upper and lower cover layers 112 and 113, and may further cover a portion of the first and second external electrodes 131 and 132 and/or an outer surface of the side margin part 114 according to a design. For example, the coating layer 150 may include an organic/inorganic compound including Si to improve moisture resistance reliability of the body 110, and may include an organic/inorganic substance including fluorine (F) and a polymer component. For example, the coating layer 150 may be implemented with a silane coupling agent or silicone-resin to have water repellency.

The upper and lower cover layers 112 and 113 may be disposed to sandwich the capacitance formation region 116 therebetween in the first direction (e.g., the T direction) and may be thicker than each of the at least one dielectric layer 111.

The upper and lower cover layers 112 and 113 may prevent external environmental elements (e.g., moisture, a plating solution, foreign substances) from penetrating into the capacitance formation region 116, may protect the body 110 from external impact, and improve bending strength of the body 110.

For example, the upper and lower cover layers 112 and 113 and/or the side margin parts 114 may include the same material as the at least one dielectric layer 111 (e.g., barium titanate-based ceramic material) or a different material (e.g., a thermosetting resin such as an epoxy resin).

The side margin part 114 may include a portion between a boundary line between the at least one first internal electrode 121 and the at least one second internal electrode 122 and the surface of the body 110 in the second direction (e.g., the W direction). That is, the side margin part 114 may not overlap the at least one first internal electrode 121 and the at least one second internal electrode 121 in the first direction (e.g., the T direction). One portion and the other portion of the side margin part 114 may be disposed to sandwich the capacitance formation region 116 therebetween in the second direction (e.g., the W direction).

The side margin part 114 may prevent the at least one first internal electrode 121 and the at least one second internal electrode 122 from being exposed to the surface of the body 110 in the second direction (e.g., the W direction), thereby preventing external environmental elements (e.g., moisture, a plating solution, foreign substances) from penetrating into the at least one first internal electrode 121 and the at least one second internal electrode 122 through the surface in the second direction (e.g., the W direction) and improving the reliability and lifespan of the multilayer capacitor 100. In addition, since the at least one first internal electrode 121 and the at least one second internal electrode 122 may be efficiently expanded to be formed in the second direction due to the side margin part 114, the side margin part 114 may increase an overlapping area of the at least one first internal electrode 121 and the at least one second internal electrode 122, thereby contributing to an improvement of capacitance of the multilayer capacitor 100.

Since the capacitance formation region 116 may include a portion between the at least one first internal electrode 121 and the at least one second internal electrode 122, capacitance of the multilayer capacitor 100 may be formed.

The capacitance formation region 116 may include a stack structure in which at least one first internal electrode 121 and at least one second internal electrode 122 are alternately stacked in the first direction (e.g., the T direction) with at least one dielectric layer 111 interposed therebetween, and may have the same size as the stack structure.

Referring to FIGS. 2, 3 and 4, the capacitance formation region 116 may further include a third internal electrode 123 connected to the first external electrode 131, a fourth internal electrode 124 connected to the second external electrode 132, and a fifth internal electrode 125 not connected to the first and second external electrodes 131 and 132 and overlapping a portion of each of the third and fourth internal electrodes 123 and 124 in the first direction (e.g., the T direction).

An overlapping area between the third internal electrode 123 and the fifth internal electrode 125 in the first direction (e.g., in the T direction) may be a base of first additional capacitance formed by the third and fifth internal electrodes 123 and 125, and an overlapping area between the fourth internal electrode 124 and the fifth internal electrode 125 in the first direction (e.g., the T direction) may be a base of second additional capacitance formed by the fourth and fifth internal electrodes 124 and 125.

Figure 5:
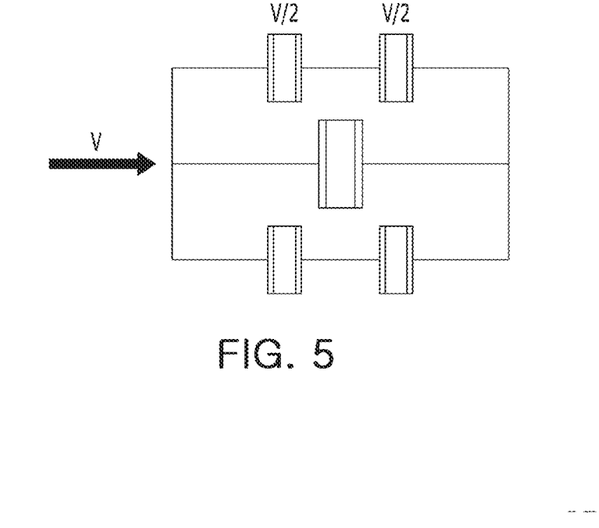
FIG. 5 is an equivalent circuit diagram illustrating a structure in which a body of FIG. 4 forms capacitance.

Referring to FIGS. 4 and 5, the first and second additional capacitances may be provided in series between the first and second external electrodes 131 and 132. When a voltage V is applied between the first and second external electrodes 131 and 132, a voltage between the third and fifth internal electrodes 123 and 125 may be half of the voltage V and a voltage between the fourth and fifth internal electrodes 123 and 125 may be half of the voltage V. Meanwhile, a voltage between the at least one first internal electrode 121 and the at least one second internal electrode 122 may be V.

At least one second internal electrode 122 and fourth and fifth internal electrodes 124 and 125, which are internal electrodes not connected to the first external electrode 131, may form an electric field in a direction toward the first external electrode 131, and a magnitude of the formed electric field may be proportional to a voltage applied to the at least one second internal electrode 122 and the fourth and fifth internal electrodes 124 and 125. At least one first internal electrode 121 and the third and fifth internal electrodes 123 and 125, which are internal electrodes not connected to the second external electrode 132, may form an electric field in a direction toward the second external electrode 132, and a magnitude of the formed electric field may be proportional to a voltage applied to the at least one first internal electrode 121 and the third and fifth internal electrodes 123 and 125.

The electric field formed between the external electrodes and the internal electrodes may impart deflection of electrons of each of the materials contained in the position in which the electric field is formed in the body 110. The insulating properties of the materials may be interpreted as the ability to maintain homeostasis with respect to the deflection of electrons, and the homeostasis may be gradually reduced when the deflection of the electrons is strongly and continuously imparted. The possibility of defects (e.g., cracks, burnt, etc.) of the body 110 may increase as the homeostasis decreases. Since the reliability of the body 110 may be higher as a short-term failure probability and a long-term failure probability of the body 110 are lower, improvement of the reliability of the body 110 may be reducing a rate at which the homeostasis decreases.

Accordingly, as the electric field formed between the external electrodes and the internal electrodes decreases, the reliability of the position in which the electric field is formed in the body 110 may be improved. Since each of the voltage between the third and fifth internal electrodes 123 and 125 and the voltage between the fourth and fifth internal electrodes 124 and 125 may be half of the voltage between the at least one first internal electrode 121 and the at least one second internal electrode 122, the magnitude of the electric field from the third, fourth, and fifth internal electrodes 123, 124, and 125 toward the first and second external electrodes 131 and 132 may also be half of the magnitude of the electric field from the at least one first internal electrode 121 and the at least one second internal electrode 122 toward the first and second external electrodes 131 and 132, and thus, the third, fourth and fifth internal electrodes 123, 124, and 125 may be more advantageous in improving the reliability of the body 110.

However, assuming the same number of stacked layers, since the first and second additional capacitances formed by the third, fourth, and fifth internal electrodes 123, 124, and 125 are connected in series with each other, the first and second additional capacitances may be less than the capacitance formed by the at least one first internal electrode 121 and the at least one second internal electrode 122.

Accordingly, when the third, fourth, and fifth internal electrodes 123, 124, and 125 are disposed at positions in which the formation of an electric field toward the first and second external electrodes 131 and 132 has a greater effect on the reliability of the body 110, the capacitance formation region 116 may obtain both a high capacitance based on the at least one first internal electrode 121 and the at least one second internal electrode 122 and high reliability based on the third, fourth, and fifth internal electrodes 123, 124, and 125.

In the capacitance formation region 116, a portion between the internal electrode closest to the first and second external electrodes 131 and 132 in the first direction (e.g., the T direction) and the first and second external electrodes 131 and 132 may further significantly affect the reliability of the body 110, compared to the other portions. This is because, a portion (which may be defined as a bending portion) disposed in the first direction (e.g., the T direction) of the body 110 in the first and second external electrodes 131 and 132 may be closer to edges of the first and second external electrodes 131 and 132 and the edges of the first and second external electrodes 131 and 132 have a high possibility of a bottleneck of an electric field formed with a geometrically close internal electrode.

In the capacitance formation region 116, the internal electrode closest to the first and second external electrodes 131 and 132 in the first direction (e.g., the T direction) may be one of the third, fourth, and fifth internal electrodes 123, 124, and 125.

Accordingly, the effect of the electric field formed by the third, fourth, and fifth internal electrodes 123, 124, and 125 and the first and second external electrodes 131 and 132 on the reliability of the body 110 may be effectively reduced, and capacitance compared to a unit volume of the capacitance formation region 116 according to addition of the third, fourth, and fifth internal electrodes 123, 124, and 125 may be significantly secured.

The effect of the electric field between the internal electrode of the capacitance formation region 116 and the first and second external electrodes 131 and 132 on the reliability of the body 110 may increase as a voltage applied to the first and second external electrodes 131 and 132 is higher, as the body 110 is smaller, or as the body 110 is close to a structure (a reduction in the thickness of the upper cover layer, the lower cover layer, and the side margin part) advantageous for increasing capacitance, compared to the unit volume. When the multilayer capacitor 100 according to an embodiment of the present invention is used in an electric device, the voltages applied to the first and second external electrodes 131 and 132 may be high. When the multilayer capacitor 100 according to an exemplary embodiment in the present disclosure is used in an electronic device, the body 110 itself may also be small, and the body 110 may be close to a structure advantageous for increasing capacitance compared to the unit volume.

Effectively reducing the effect of the electric field between the internal electrodes of the capacitance formation region 116 and the first and second external electrodes 131 and 132 on the reliability of the body 110 in the multilayer capacitor 100 according to an exemplary embodiment in the present disclosure may include both of a fact that an effective rated voltage may be efficiently increased so that the multilayer capacitor 100 is efficiently used in an electric device and a fact that the multilayer capacitor 100 is advantageously miniaturized, while securing reliability to be efficiently used in an electronic device.

For example, an internal electrode closest to the first external electrode 131 in the capacitance formation region 116 in the first direction (e.g., the T direction) may be the third internal electrode 123, and an internal electrode closest to the second internal electrode in the capacitance formation region 116 in the first direction (e.g., the T direction) may be the fourth internal electrode 124.

The first external electrode 131 and the third internal electrode 123 may have the same voltage, and the second external electrode 132 and the fourth internal electrode 124 may have the same voltage. Accordingly, the third internal electrode 123 closest to the first external electrode 131 may block a portion of an electric field formation path between the first external electrode 131 and the capacitance formation region 116, and the fourth internal electrode 124 closest to the second electrode 132 may block a portion of an electric field formation path between the second external electrode 132 and the capacitance formation region 116. Accordingly, the effect of the electric field between the internal electrode of the capacitance formation region 116 and the first and second external electrodes 131 and 132 on the reliability of the body 110 may be more efficiently reduced.

Here, an internal electrode forming an electric field with the first and second external electrodes 131 and 132 may be the fifth internal electrode 125, and a path for forming the electric field may be a structure bypassing further than a shortest path the same as the first direction. As the path for forming the electric field is further bypassed, the effect of the electric field between the internal electrode of the capacitance formation region 116 and the first and second external electrodes 131 and 132 on the reliability of the body 110 may be more efficiently reduced.

Referring to FIG. 3, a width (or length in the W direction) of the fifth internal electrode 125 may be narrower than a width (or length in the W direction) of each of the third and fourth internal electrodes 123 and 124. Accordingly, in the third and fourth internal electrodes 123 and 124, the electric field formation path between the first and second external electrodes 131 and 132 and the fifth internal electrode 125 may be further bypassed, and thus, the effect of the electric field between the internal electrode of the capacitance formation region 116 and the first and second external electrodes 131 and 132 on the reliability of the body 110 may be more efficiently reduced.

In the capacitance formation region 116, the effect of a thickness (T1−a) of the region in which the at least one first internal electrode 121 and the at least one second internal electrode 122 form capacitance with each other on capacitance may be greater than the effect of a total thickness (a=a1+a2) of the plurality of regions on the reliability improvement performance of the third, fourth, and fifth internal electrodes 123, 124, and 125.

Accordingly, in the capacitance formation region 116, the region in which the at least one first internal electrode 121 and the at least one second internal electrode 122 form capacitance with each other may be disposed between a plurality of regions in which the third, fourth, and fifth internal electrodes 123, 124, and 125 form capacitance in the capacitance formation region 116 and may be thicker than the total thickness (a=a1+a2) of the plurality of regions. Accordingly, the multilayer capacitor 100 according to an exemplary embodiment in the present disclosure may efficiently obtain high capacitance based on the at least one first internal electrode 121 and at least one second internal electrode 122 and high reliability based on the third, fourth, and fifth internal electrodes 123, 124, and 125 overall.

For example, the number of each of the third and fourth internal electrodes 123 and 124 may be plural and may be greater than the number of the fifth internal electrodes 125. Accordingly, the third and fourth internal electrodes 123 and 124 closest to the at least one first internal electrode 121 or the at least one second internal electrode 122 may be closer to the center of the body 110 than the fifth internal electrode 125 closest to the at least one first internal electrode 121 or the at least one second internal electrode 122.

For example, in a direction (e.g., the L direction) in which the first and second external electrodes 131 and 132 face each other, a length of each of the at least one first internal electrode 121 and at least one second internal electrode 122 may be greater than half of the length of the body 110, and a length of each of the third and fourth internal electrodes 123 and 124 may be less than half of the length of the body 110.

Accordingly, the third and fourth internal electrodes 123 and 124 may form a gap therebetween, and the gap between the at least one first internal electrode 121 and the second external electrode 132 and the gap between the at least one second internal electrode 122 and the first external electrode 131 may increase an overall gap arrangement balance of the structure of the body 110 close to the edge of the body 110 in the L direction. Accordingly, stacking stability of the body 110 (e.g., delamination possibility reduction performance) may be further improved.

Referring to FIG. 4, at least one of the first and second external electrodes 131 and 132 may include at least one of conductive resin layers 131b and 132b containing a resin, base electrode layers 131a and 132a disposed between the conductive resin layers 131b and 132b and the body 110 and having higher conductivity than the conductive resin layers 131b and 132b, and plating layers 131c and 132c providing an outer surface of one of the first and second external electrodes 131 and 132.

For example, the base electrode layers 131a and 132a may be formed as a portion of the body 110 is dipped into a paste containing a metal material and/or a glass frit or the body 110 is fired in a state in which the paste is printed on a portion of the body 110, and may also be formed by a sheet transfer or a pad transfer method. The metal material may be copper (Cu) to improve electrical connectivity for the body 110, but is not limited thereto. For example, the metal material may include at least one of copper (Cu), nickel (Ni), palladium (Pd), platinum (Pt), gold (Au), silver (Ag), and lead (Pb) and may vary depending on the metal material of the internal electrode in the body 110.

For example, the plating layers 131c and 132c may be formed by sputtering or electroplating (electric deposition), but are not limited thereto. For example, the plating layers 131c and 132c may include an inner plating layer containing nickel (Ni) and an outer plating layer containing tin (Sn).

For example, the conductive resin layers 131b and 132b may include a thermosetting resin such as epoxy and a plurality of conductive particles (e.g., the same as the metal material of the base electrode layer). However, a material of the conductive resin layers 131b and 132b is not limited to the thermosetting resin, and the conductive resin layers 131b and 132b may include bisphenol A resin, glycol epoxy resin, novolak epoxy resin, or derivatives thereof, which have a small molecular weight and are liquid at room temperature.

The conductive resin layers 131b and 132b may improve durability against external shocks of the first and second external electrodes 131 and 132 or prevent external moisture or a plating solution from penetrating into the body 110. Therefore, the conductive resin layers 131b and 132b may reduce a rate at which the reliability of the first and second external electrodes 131 and 132 deteriorates even when the first and second external electrodes 131 and 132 are exposed to a poor environment. The multilayer capacitor 100 may be highly likely to be exposed to a relatively poor environment when used in electronic devices.

When the first and second external electrodes 131 and 132 include the base electrode layers 131a and 132a, the conductive resin layers 131b and 132b, and the plating layers 131c and 132c, the first and second external electrodes 131 and 132 may be highly likely to be exposed to a poor environment. As the possibility of a poor environment increases, a possibility that a voltage applied to the first and second external electrodes 131 and 132 is high may also increase. The multilayer capacitor 100 according to an exemplary embodiment in the present disclosure may advantageously maintain high reliability even when a high voltage is applied to the first and second external electrodes 131 and 132.

Meanwhile, when the multilayer capacitor 100 according to an exemplary embodiment in the present disclosure is miniaturized to be advantageously used in electronic devices, the upper cover layer 112 and/or the lower cover layer 113 may also contain the same material as the material (e.g., barium titanate ceramic material) of the at least one dielectric layer 111 and structural reliability of the body 110 may be increased. The multilayer capacitor 100 according to an exemplary embodiment in the present disclosure may reduce the concentration of an electric field (between the external electrode and the internal electrode) on the upper cover layer 112 and/or the lower cover layer 113, so high reliability may be secured, while being miniaturized. A thickness T2 of the body 110 may be reduced according to the miniaturization of the body 110.

Figure 6:
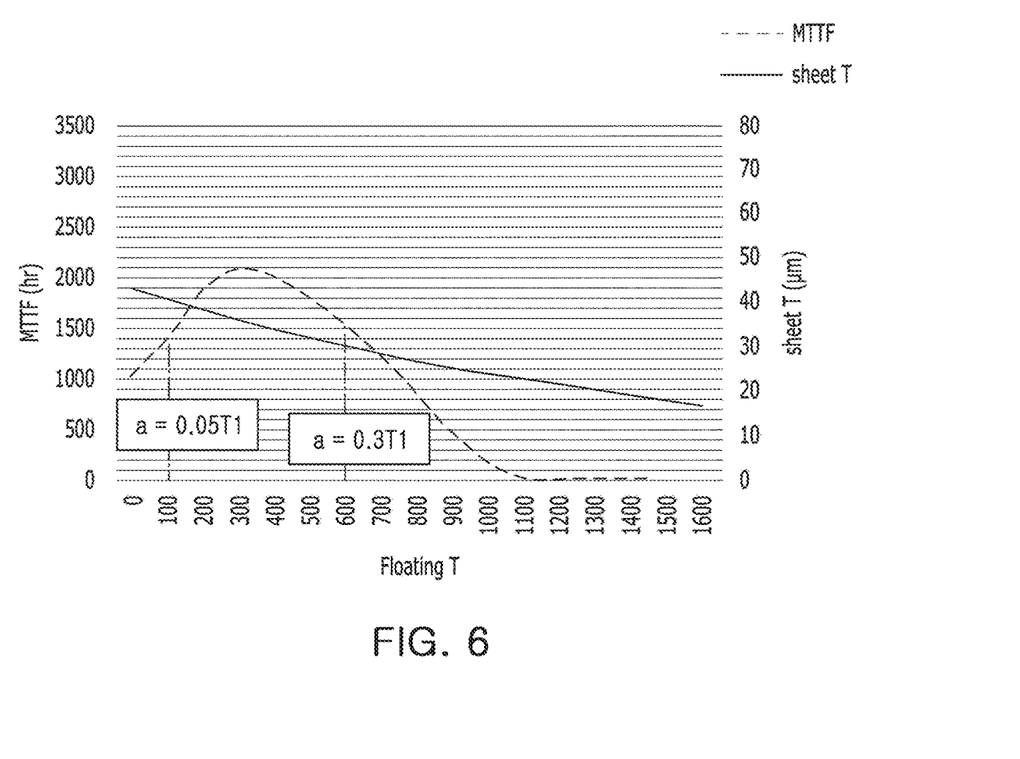
FIG. 6 is a graph illustrating reliability according to a change in the ratio of a to T1 of the body of FIG. 4.

FIG. 6 is a graph illustrating reliability according to a change in a ratio of a to T1 of the body of FIG. 4.

Referring to FIGS. 4 and 6, a sheet T of FIG. 6 may be a value obtained by subtracting the thickness T1 of the capacitance formation region 116 from the thickness T2 of the body 110 of FIG. 4. In FIG. 4, a may be a floating T (micrometer unit) of FIG. 6. MTTF of FIG. 6 may correspond to the reliability of the multilayer capacitor.

In order for the multilayer capacitor to secure a high capacitance compared to the total thickness, the sheet T may become thinner as a increases, but is not limited thereto.

The MTTF corresponding to reliability may increase as a increases, and a gradient of change in MTTF may be steep when a is 5% of T1.

If a is too large, the sheet T may be thin, so MTTF may be small, and the gradient of change in MTTF may be steep when a is 30% of T1.

When the MTTF is the highest, a may be 17.5% of T1.

Accordingly, in the capacitance formation region 116, the thickness (a=a1+a2) of the region in which the third, fourth, and fifth internal electrodes 123, 124, and 125 form capacitance with each other may be 0.05 times or more and 0.3 times or less of the total thickness T1. Accordingly, the multilayer capacitor 100 according to an embodiment of the present invention may efficiently increase reliability (corresponding to MTTF), while securing high capacitance (related to sheet T).

The thickness a1, a2, T1, and T2 may be measured as average thicknesses of portions corresponding to the thicknesses a1, a2, T1, and T2 in an exposed L-T cross-section after the body 110 is cut or polished (in the W direction) to an L-T plane including the center of the body 110. For example, the L-T cross-section may be applied to analysis using at least one of transmission electron microscopy (TEM), atomic force microscope (AFM), scanning electron microscope (SEM), an optical microscope, and a surface profiler, and the thicknesses a1, a2, T1, and T2 may be measured by checking an image obtained according to the analysis with naked eyes or image processing (e.g., identifying pixels based on color or brightness of the pixels, filtering pixel values for pixel identification efficiency, integrating distances between identified pixels, etc.) Other measurement methods and/or tools appreciated by one of ordinary skill in the art, even if not described in the present disclosure, may also be used.

Figure 7:
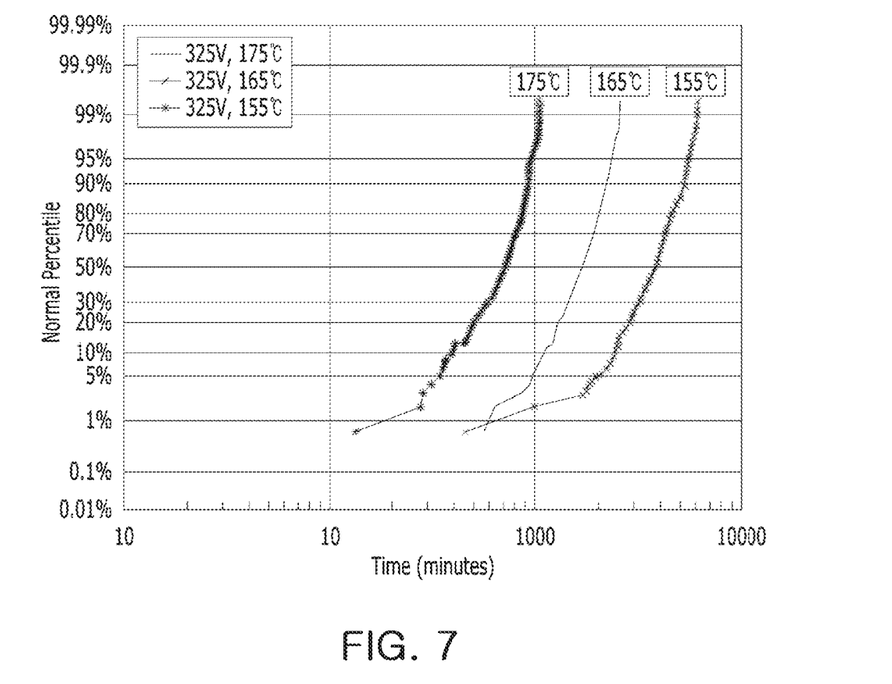
FIG. 7 is a graph illustrating a relationship between MTTF and reliability of FIG. 6.

FIG. 7 is a graph illustrating a relationship between MTTF and reliability of FIG. 6.

Referring to FIG. 7, the multilayer capacitor samples in which a high voltage (e.g., 325V) is applied between the first and second external electrodes and at a predetermined temperature (e.g., 155° C., 165° C., or 175° C.) may be changed from a normal state to a failure state as time elapses, and thus, the vertical axis of FIG. 7 indicates a ratio at which the multilayer capacitor samples are changed to the failure state in a state in which times corresponding to the horizontal axis have elapsed.

Since MTTF is an abbreviation of Mean Time to Failure, it is a time when the ratio is 50%. As the time increases, the multilayer capacitor samples may well maintain homeostasis even in a poor environment (e.g., high voltage, high temperature) and may have high reliability.

The MTTF of FIG. 6 was measured with multilayer capacitor samples in which a high voltage of 1000 V was applied between the first and second external electrodes and the temperature was 105° C.

As set forth above, according to exemplary embodiments in the present disclosure, since a large electric field according to application of a high voltage to the external electrodes is efficiently distributed, it is advantageous to have a high effective rated voltage, a long lifespan in a high voltage environment, or secure reliability which becomes important according to miniaturization.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
    a body including a capacitance formation region in which at least one first internal electrode and at least one second internal electrode are alternately stacked in a first direction with at least one dielectric layer interposed therebetween; and
    first and second external electrodes disposed on the body and spaced apart from each other to be connected to the at least one first internal electrode and the at least one second internal electrode, respectively, wherein a portion of the at least one first internal electrode and a portion of the at least one second internal electrode overlap each other in the first direction, the capacitance formation region further includes a third internal electrode connected to the first external electrode, a fourth internal electrode connected to the second external electrode, and a fifth internal electrode not connected to the first and second external electrodes and overlapping a portion of each of the third and fourth internal electrodes in the first direction, an internal electrode closest to the first external electrode in the first direction in the capacitance formation region is the third internal electrode, an internal electrode closest to the second external electrode in the first direction in the capacitance formation region is the fourth internal electrode, the third, fourth, and fifth internal electrodes are spaced apart from outer surfaces of the body in a second direction perpendicular to the first direction, and a width of the fifth internal electrode is smaller than a width of each of the third and fourth internal electrodes in the second direction.

2. The multilayer capacitor of claim 1, wherein
the third internal electrode is one of a plurality of third internal electrodes,
the fourth internal electrode is one of a plurality of fourth internal electrodes,
the fifth internal electrode is one of at least one fifth internal electrode,
the number of the plurality of third internal electrodes is greater than the number of the at least one fifth internal electrode, and
the number of the plurality of fourth internal electrodes is greater than the number of the at least one fifth internal electrode.

3. The multilayer capacitor of claim 1, wherein, in a direction in which the first and second external electrodes face each other, each of a length of the at least one first internal electrode and a length of the at least one second internal electrode is greater than half of a length of the body, and a length of each of the third and fourth internal electrodes is less than half of the length of the body.

4. The multilayer capacitor of claim 1, wherein
at least one of the first and second external electrodes includes:
a conductive resin layer containing a resin;
a base electrode layer disposed between the conductive resin layer and the body and having higher conductivity than the conductive resin layer; and
a plating layer including an outer surface of the at least one of the first and second external electrodes.

5. The multilayer capacitor of claim 1, wherein
the body further includes an upper cover layer and a lower cover layer,
the capacitance formation region is disposed between the upper cover layer and the lower cover layer, and
each of the at least one dielectric layer, the upper cover layer, and the lower cover layer contains a barium titanate (BaTiO3)-based ceramic material.

6. The multilayer capacitor of claim 1, wherein a thickness of a region in which the third, fourth, and fifth internal electrodes form capacitance with each other is 0.05 times or more and 0.3 times or less of a total thickness of the capacitance formation region.

7. The multilayer capacitor of claim 1, wherein a region in which the at least one first internal electrode and the at least one second internal electrode form capacitance with each other is disposed between a plurality of regions in which the third, fourth, and fifth internal electrodes form capacitance with each other, and has a larger thickness than a total thickness of the plurality of regions in which the third, fourth, and fifth internal electrodes form capacitance with each other.

8. A multilayer capacitor comprising:
a body including a capacitance formation region in which at least one first internal electrode and at least one second internal electrode are alternately stacked in a first direction with at least one dielectric layer interposed therebetween; and
first and second external electrodes disposed on the body and spaced apart from each other to be connected to the at least one first internal electrode and the at least one second internal electrode, respectively,
wherein a portion of the at least one first internal electrode and a portion of the at least one second internal electrode overlap each other in the first direction,
the capacitance formation region further includes a third internal electrode connected to the first external electrode, a fourth internal electrode connected to the second external electrode, and a fifth internal electrode not connected to the first and second external electrodes and overlapping each of the third and fourth internal electrodes in the first direction,
a region in which the at least one first internal electrode and the at least one second internal electrode form capacitance with each other is disposed between a plurality of regions in which the third, fourth, and fifth internal electrodes form capacitance with each other, and has a larger thickness than a total thickness of the plurality of regions in which the third, fourth, and fifth internal electrodes form capacitance with each other, and
the third and fourth internal electrodes are disposed on the same level in the first direction.

9. The multilayer capacitor of claim 8, wherein a thickness of a region in which the third, fourth, and fifth internal electrodes form capacitance with each other is 0.05 times or more and 0.3 times or less of a total thickness of the capacitance formation region.

10. The multilayer capacitor of claim 8, wherein a width of the fifth internal electrode is smaller than a width of each of the third and fourth internal electrodes.

11. The multilayer capacitor of claim 8, wherein
the third internal electrode is one of a plurality of third internal electrodes,
the fourth internal electrode is one of a plurality of fourth internal electrodes,
the fifth internal electrode is one of at least one fifth internal electrodes,
the number of the plurality of third internal electrodes is greater than the number of the at least one fifth internal electrode, and
the number of the plurality of fourth internal electrodes is greater than the number of the at least one fifth internal electrode.

12. The multilayer capacitor of claim 8, wherein
at least one of the first and second external electrodes includes:
a conductive resin layer containing a resin;
a base electrode layer disposed between the conductive resin layer and the body and having higher conductivity than the conductive resin layer; and
a plating layer providing an outer surface of one of the first and second external electrodes.

13. The multilayer capacitor of claim 8, wherein
the body further includes an upper cover layer and a lower cover layer,
the capacitance formation region is disposed between the upper cover layer and the lower cover layer, and
each of the at least one dielectric layer, the upper cover layer, and the lower cover layer contains a barium titanate (BaTiO3)-based ceramic material.

14. A multilayer capacitor comprising:
a body including a plurality of dielectric layers a plurality of internal electrodes alternately stacked in a first direction with a respective one of the plurality of dielectric layers interposed therebetween to form a capacitance formation region; and
first and second external electrodes disposed on the body and spaced apart from each other,
wherein the capacitance formation region is divided into three regions which are an upper region, a lower region, and a center region disposed between the upper and lower regions,
at least one first internal electrode and at least one second internal electrode are disposed in the center region and connected to the first and second external electrodes, respectively, and have portions overlapping each other in the first direction,
a third internal electrode and a fourth internal electrode are disposed in each of the upper and lower regions and spaced apart from each other to be connected to the first and second external electrodes, respectively,
a fifth internal electrode is disposed in each of the upper and lower regions and spaced apart from each of the first and second external electrodes, and has portions overlapping the third and fourth internal electrodes, and
wherein the third and fourth internal electrodes are disposed on the same level in the first direction.

15. The multilayer capacitor of claim 14, wherein in each of the upper and lower regions of the capacitance formation region, the third and fourth internal electrodes are disposed in an outer side of the body in the first direction than the fifth internal electrode.

16. The multilayer capacitor of claim 14, wherein stacking orders among the third to fifth internal electrodes in the upper and lower regions of the capacitance formation region are symmetrical to each other with respect to the first direction.

17. The multilayer capacitor of claim 14, wherein a width of the fifth internal electrode is smaller than a width of each of the third and fourth internal electrodes.

18. The multilayer capacitor of claim 14, wherein a thickness of the center region is larger than a total thickness of the upper and lower regions in the first direction.

19. The multilayer capacitor of claim 14, further comprising a coating layer covering outer surfaces of the body in the first direction and further covering a portion of each of the first and second external electrodes in the first direction.

* * * * *